United States Patent
Revel et al.

(10) Patent No.: US 7,641,887 B2
(45) Date of Patent: Jan. 5, 2010

(54) ALUMINA-ON-ALUMINA COMPOSITE SUPPORTS

(75) Inventors: Renaud Revel, Serpaize (FR); Stéphane Morin, Rueil Malmaison (FR); Lars Fischer, Seysuel (FR); Christophe James, Chuzelles (FR)

(73) Assignee: Institut Francias du Petrole, Rueil Malmaison Cedex (FR)

( * ) Notice: Subject to any disclaimer, the term of this patent is extended or adjusted under 35 U.S.C. 154(b) by 305 days.

(21) Appl. No.: 11/236,799

(22) Filed: Sep. 28, 2005

(65) Prior Publication Data

US 2006/0067877 A1    Mar. 30, 2006

(30) Foreign Application Priority Data

Sep. 28, 2004    (FR) ................... 04/10.287

(51) Int. Cl.
    *C01F 7/02* (2006.01)
(52) U.S. Cl. ................ 423/628; 423/631; 502/355
(58) Field of Classification Search ................ 423/626, 423/628, 631, 625; 502/355
    See application file for complete search history.

(56) References Cited

U.S. PATENT DOCUMENTS

| 4,293,449 A | 10/1981 | Herrington et al. |
| 4,460,699 A | 7/1984 | Convers et al. |
| 4,585,632 A | 4/1986 | Schneider et al. |
| 6,056,937 A | 5/2000 | Dupin et al. |
| 2004/0146456 A1 * | 7/2004 | Le Loarer et al. ........... 423/625 |

FOREIGN PATENT DOCUMENTS

| EP | 0 055 164 | 6/1982 |
| JP | 54157507 | 12/1979 |
| JP | 10 045412 | 2/1998 |

OTHER PUBLICATIONS

Patent Abstracts of Japan, vol. 004. No. 019; Feb. 16, 1980.
Kobayashi Hidehiko, et al: "Sinterability of Al2O3 Pre-Fired Bodies Fabricated by the Impregnation Method" Journal of the Japan Society of Powder and Powder Metallurgy, vol. 40, No. 5, May 1993, pp. 511-515.
Patent Abstracts of Japan, vol. 1998, No. 06, Apr. 30, 1998.

* cited by examiner

*Primary Examiner*—Wayne Langel
*Assistant Examiner*—James Fiorito
(74) *Attorney, Agent, or Firm*—Millen, White, Zelano & Branigan, P.C.

(57) ABSTRACT

The invention relates to the field of catalyst supports presenting a pore volume having an at least bimodal distribution, thus defining a main porosity and a secondary porosity, the main porosity being of an average size greater than the secondary porosity.

12 Claims, No Drawings

ALUMINA-ON-ALUMINA COMPOSITE SUPPORTS

BACKGROUND OF THE INVENTION

1. Field of the Invention

The invention relates to the field of catalyst supports with a specific surface area of less than 90 m²/g and having a pore volume greater than 0.3 cm³/g, this pore volume having an a least bimodal distribution defining an interconnected main porosity and secondary porosity, the main porosity being of an average size greater than the secondary porosity.

The support according to the invention allows catalysts to be produced for carrying out a large range of reactions on hydrocarbon cuts.

2. Description of Related Art

It is known in catalysis that the activity and/or the selectivity are affected by increasing the residence time of products on or near the catalytic sites. There, the known problem exists of intragranular diffusion limitation which can constitute a limit to the satisfactory development of the process whereby the reagents access the reaction site.

It is known that the intrinsic kinematics of a given chemical reaction is affected to a greater or lesser extent by the rate of supply of the reagents from the immediate vicinity of the catalytic particle towards the reaction site situated inside said particle. This phenomenon of diffusion limitation, which expresses the competition between the intrinsic kinetics and the supply of the material by diffusion to the inside of the particle, depends mainly on the size of the particle and on the porosity of the particle, more specifically on the structure of this porosity.

In order to overcome this problem, i.e. to be free of the intragranular diffusion limitations, several solutions have been proposed and described in patents which we cite and comment on below.

Firstly, there may be mentioned the solution of shell deposition of a catalytic phase on a core constituted by the support. By shell deposition is meant that the catalytic phase is situated in an outer layer of the support, called shell, this shell being able to be several tens to several hundred microns thick.

The patent documents WO 02/41990, WO98/14274, U.S. Pat. No. 6,280,608, U.S. Pat. No. 6,486,370 and U.S. Pat. No. 6,177,381 describe the preparation of solids of this type called "multilayer" solids. The original feature of these solids rests essentially in the deposition in the form of a shell of a support having the required porosity on another refractory support called solid support. The deposition of this shell is carried out by using a suspension of inorganic oxides which covers the solid support. The thickness of this shell varies from 40 to 400 microns. Subsequently, metals are impregnated in or on the shell for use in the dehydrogenation of paraffins.

The patent document WO 01/15803 describes the use of a catalyst for paraffin dehydrogenation applications. The support is composed of porous alumina. On the final catalyst, the percentage of pores comprised between 60 Å and 350 Å should be greater than 75% of the total pore volume of the catalyst. The volume of the pores comprised between 60 Å and 350 Å is greater than 0.5 cm³/g, and preferably comprised between 0.6 and 0.8 cm³/g. Finally, the volume of the smallest pores (less than 60 Å) should not exceed 0.05 cm³/g.

A grain density greater than 0.5 g/cm³ is claimed, which corresponds to that of the prior art. The technique used to measure the porosity is mercury intrusion. Moreover, the catalyst should have a specific surface area greater than 100 m²/g.

The patent U.S. Pat. No. 5,358,920 describes the use of a catalyst for the dehydrogenation of hydrocarbons. The support used is produced in a single synthesis stage by neutralization of aluminum chloride by ammonium hydroxide at 60-70° C. and at a pH comprised between 7.5 and 8.5. The resulting precipitate is resuspended to be shaped by the oil drop coagulation technique. After calcination between 600° C. and 800° C. under an air-water mixture, the support has a theta alumina crystallographic form. This support has a bimodal porous distribution, with 40% of the pore volume occupied by the pores comprised between 1000 Å and 10,000 Å. It is clear to a person skilled in the art that this one-stage synthesis process cannot result in the obtaining of a hierarchical porosity, i.e. differentiated into at least two modes.

The patent U.S. Pat. No. 5,677,260 describes the preparation and the use of a composite catalyst for the dehydrogenation of paraffins to monoolefins. The support used is in the form of beads 1.4 to 2 mm in diameter. This support is mesoporous and preferably uses a gamma alumina (60 to 80% crystallinity), with a surface area comprised between 120 m²/g and 250 m²/g, and a pore volume comprised between 1.4 and 2.5 cm³/g. With regard to the diameter of the beads and the specific surface area in question, the intragranular diffusion phenomena are probably very significant in this type of support.

The patent U.S. Pat. No. 4,914,075 describes the composition of a dehydrogenation catalyst. The support is alumina with a specific surface area comprised between 50 m²/g and 120 m²/g and apparent grain density greater than 0.5 g/cm³. No details are given about either the pore volume or the size of the pores. The description of the production of the support clearly shows that this support is produced in a single synthesis stage, followed by a calcination stage (800° C. to 1020° C.) according to the nature of the desired alumina phase (gamma, theta or alpha). According to the cited patent, it is preferable to have theta alumina and this at a level of 75% crystallites (the others being able to be gamma alumina or alpha alumina). In this patent, if several crystallographic phases of alumina can be present, there is no concept of order or of hierarchy between these phases.

The patent U.S. Pat. No. 4,672,146 describes the composition of a dehydrogenation catalyst. The support is an alumina having a surface area comprised between 5 m²/g and 150 m²/g, 18% of the total pore volume of which is associated with pores less than 300 Å in diameter, and 55% of the total pore volume is associated with pores greater than 600 Å in diameter. It should be noted that the preparation process for this support comprises a single synthesis phase usually leading to a mixture of different alumina crystallographic phases.

The patent EP 1142637 describes the preparation of a catalyst for distillate hydroconversion. The support is mixed micro- (50 to 75% by weight) and macroporous (50 to 25% by weight) alumina. The authors mean by microporous that 95% of the volume of this alumina corresponds to a pore diameter of less than 80 Å. The authors mean by macroporous that at least 70% of the volume of this alumina corresponds to a pore diameter comprised between 60 Å and 600 Å. The preparation processes cited (including that of patent EP 1142637)

have recourse to the precipitation in one or several stages of a gel, followed by a shaping and a heat treatment. In this case, the micro- and the macroporosity are interwoven without any hierarchical order.

The patents EP0758919 and EP0882503 describe the preparation of high-activity catalysts. The sought applications are the operations of hydrotreatment (hydrodenitrogenation, hydrodesulfuration, hydrodemetallation, hydroconversion, hydrocracking), hydrogenation/dehydrogenation, reforming, isomerization and the Claus process. These patents are centred round a method for preparing catalysts, namely the introduction of a chelating agent before, during or after impregnation of the active phase. The influence of this chelating agent would be to create an interaction between the amorphous alumina and the active phase, this interaction being identified by the presence at the surface of a microcrystalline alumina of a size comprised between 8 Å and 25 Å, as well as gamma alumina serving as support, which has a crystallite size greater than 30 Å. The appearance of this nano-crystalline phase leads to the increase in the specific surface area as well as the appearance of a bimodal mesoporous structure comprising a first set of pores of a size less than 40 Å and a second set of pores of a size greater than 50 Å. The porosity measurements are carried out on the nitrogen desorption branch. The obtained catalyst has a surface area of at least 100 $m^2/g$.

The article by M. Pan et al, J. Memb. Sci, 158 (1999) 235-241 ("Journal of Membrane Science") describes the preparation of membranes of nanoporous aluminas by chemical vapor deposition (CVD). The use of such a technique leads to a homogeneous covering of the surface of the support (here an alpha alumina of 0.2-micron pore size). However, because of the technique used, the deposition does not create porosity and leads to a decrease in the specific surface area.

The patent U.S. Pat. No. 5,518,979 deals with catalyst supports based on abrasion-resistant transition alumina. The alumina support is composed of gamma and kappa alumina (with a maximum of 10% delta alumina) or theta and kappa alumina (with a maximum of 10% alpha alumina) and has either a monomodal or bimodal distribution in a range of pores of a size comprised between 100 Å and 1500 Å and having a surface area ranging from 33 $m^2/g$ to 63 $m^2/g$ (determined by mercury porosimetry). The preparation method described in this patent consists of mixing two different alumina precursors, namely an amorphous alumina precursor, leading after calcination to kappa alumina, and a precursor such as a boehmite or pseudo-boehmite leading after calcination to gamma, delta or theta aluminas.

Cini et al, in J. Memb. Sci., 55 (1991) 199 ("Journal of Membrane Science") deal with the preparation of ceramic membranes to serve as catalyst supports. They use macroporous alpha alumina supports, with multimodal pore size distribution, since these supports are ceramic tubes comprising a first layer with an 85-nm pore diameter, a second layer with a 650-nm diameter and a third layer with a 3000-nm diameter. Deposited on this alumina is a boehmite sol, precursor of a gamma alumina which would develop a specific surface area estimated by the authors at 130 $m^2/g$. They manage to deposit up to 9% alumina, thereby allowing an increase in the specific surface area of 1 to 13 $m^2/g$. The deposited alumina has a pore size comprised between 2.5 and 4.5 nm. The deposited films have a thickness ranging from 3 to 57 μm, which clearly indicates that the alumina is deposited either in the porosity of the most macroporous layer or on the surface of the tubes.

The patent EP 0586745 describes the formation of a ceramic membrane achieved by a purely mesoporous (pore diameter comprised between 3 and 5 nm) and microporous (pore diameter less than 2 nm) support. This porosity is not capable of resolving the problems of intragranular diffusion limitation.

BRIEF SUMMARY OF THE INVENTION

For the sake of clarity hereafter, the designation "preformed solid" is given to the part of the support carrying the main porosity, the surface layer added to the preformed solid providing the secondary porosity.

According to the invention the final support constituted by the preformed solid and the surface layer is simply called "support".

The invention therefore describes a catalyst support and a process for producing said support.

The support which is the subject of the invention is composite, multi-modal and mostly composed of a mixture of theta and/or alpha alumina, inside which there is deposited a layer of amorphous alumina or a layer of crystallized alumina with crystalline forms chosen from the following forms: gamma, delta, theta, chi or kappa.

This layer is created either from a preformed solid composed of a mixture of theta and/or alpha aluminas, followed by a stage of impregnation by an aluminum salt, or by partial or total dissolution of the alumina of the support by means of a solubilizing agent, followed by a stage of precipitation of said aluminum salt.

The support thus formed has a specific surface area of less than 90 $m^2/g$ and a pore volume having an at least bimodal distribution, defining a main porosity corresponding to the larger pores and a secondary porosity corresponding to the smaller pores, these two porosities being connected.

This bimodal distribution moreover has a structural characteristic which can be summed up by saying that any element in the main porosity is connected either to the outside of the support, or to at least one element in the secondary porosity, the expression "either . . . or" not to be taken in an exclusive sense, which means that an element in the main porosity can be connected to the outside and to another element in the secondary porosity.

Other elements in the main porosity can be interconnected.

In the remainder of the text, in order to qualify this structural characteristic, reference will be made to "ordered porosity", knowing that in the case where the support optionally has a third level of porosity, this third level would have the same structural characteristic vis-à-vis the second level.

The benefit of a structure with ordered porosity is to reduce the risk of intra-granular diffusion limitation, by guiding the reagents or the species which are to be adsorbed along a route allowing them to reach the secondary porosity more easily than if the latter were randomly distributed within the main porosity.

In fact, as a result of this ordered structure, the reagents penetrate inside the support; coming from the outside, preferentially passing through the main porosity, they then reach the secondary porosity from the main porosity and so on.

The preparation process for the support which is the subject of the present invention is characterized by the use of a preformed solid on which a surface layer is deposited, followed by calcination.

The surface layer deposit can be obtained from an external aluminum salt, the aluminum salt being dissolved in a protic solvent and having an acid or basic source.

The acid source of the aluminum salt can in certain cases have a mineral counter ion selected from the group consisting of aluminum chloride, aluminum sulfate and aluminum nitrate.

In other cases, the acid source of the aluminum salt can have an organic counter ion such as a carboxylic group.

Finally in yet other cases, the basic source of the aluminum salt can be sodium aluminate and/or potassium aluminate.

Another preparation process for the support according to the invention consists of supplying the aluminum source by partial dissolution of the preformed solid, this dissolution being caused by the supply of an acid, basic and/or complexing source.

In this case, the agent complexing the aluminum salt can be selected from the group consisting of the citrate, oxalate, formate, acetylacetone, fluorine and sulfate, and more particularly from the group consisting of the citrate, oxalate or formate.

The use of the supports which are the subjects of the present invention for catalytic purposes requires the deposition of a catalytic phase which will not be described in the present text, but will be described as a function of the uses in subsequent applications relative to these uses.

DETAILED DESCRIPTION OF THE INVENTION

The invention describes a process for producing a multi-modal composite catalyst support, i.e. having a porosity distributed into at least a main porosity and a secondary porosity with a pore size smaller than that of the main porosity, these two porosities being interconnected whilst keeping to an ordered structure.

The main porosity is supported by a solid mostly constituted by a mixture of theta and alpha alumina, inside which there is deposited a layer of amorphous alumina or crystallized alumina with crystalline forms chosen from the following forms: gamma, delta, theta, chi or kappa, said layer supporting the secondary porosity.

This layer supporting the secondary porosity is generally created from a preformed solid composed of a mixture of theta or alpha aluminas, followed in a first variant by a stage of impregnation of an aluminum salt or, in a second variant, by total or partial dissolution of the alumina in the preformed solid using a solubilizing agent, followed by a stage of precipitation of said aluminum salt.

The support thus formed has a specific surface area of less than 90 $m^2/g$, preferably less than 80 $m^2/g$, very preferably less than 75 $m^2/g$, a pore volume with an at least bimodal structure, having an interconnected main porosity and secondary porosity, this pore structure being moreover ordered in the sense defined by the rule "any element in the main porosity is connected either to the outside, or to at least one element in the second porosity".

The preformed solid can either be obtained as such by a producer, or itself be produced according to techniques known to a person skilled in the art. The invention does not relate to this preformed solid as such, but essentially to the addition to this preformed solid, carrying the main porosity, of an additional element carrying the second porosity, optionally a tertiary or quaternary porosity.

The production of the support which is the subject of the present invention comprises the following stages:

a) Choice of the Alumina Composing the Preformed Solid

In order to constitute the preformed solid, any alumina compound of general formula $Al_2O_3$, $nH_2O$ can be used. Its initial specific surface area is generally comprised between 150 and 600 $m^2/g$. It is in particular possible to use hydrated alumina compounds such as: hydrargillite, gibbsite, bayerite, boehmite, pseudo-boehmite and amorphous or essentially amorphous alumina gels.

It is also possible to use the dehydrated forms of these compounds which are constituted by transition aluminas, and which comprise at least one of the crystalline phases chosen from the group formed by: rho, chi, eta, gamma, kappa, theta, delta and alpha. The elements of this group are essentially differentiated by the organization of their crystalline structure.

During heat treatments, these different forms are capable of evolution among themselves, according to a complex relationship which depends on the operating conditions of the treatment.

b) Shaping of the Supports

The shaping of the support can be carried out according to any technique known to a person skilled in the art. The shaping can be carried out for example by extrusion, by pelleting, by the "oil-drop" coagulation method, by granulation on a turntable, or by any other method well known to a person skilled in the art.

The supports prepared according the invention generally have the shape of spheres or extrudates.

Moreover the supports used according to the present invention may have been treated, as is well known to a person skilled in the art, with additives for facilitating shaping and/or improving their final mechanical properties.

By way of examples of additives, there can be mentioned in particular cellulose, carboxy-methyl-cellulose, carboxy-ethyl-cellulose, tall oil, xanthan gums, surfactants, flocculating agents such as polyacrylamides, carbon black, starches, stearic acid, polyacrylic alcohol, polyvinyl alcohol, biopolymers, glucose, polyethylene glycols etc.

The adjustment of the porosity characteristic of the supports of the invention is partially carried out during this stage of shaping the support particles.

By "adjustment of the porosity" is meant obtaining the characteristics of the latter, namely the at least bi-modal distribution, interconnection of the main and secondary porosities, and the ordered character.

c) Drying or Calcination of the Preformed Solid

The drying of the preformed solid is carried out by any technique known to a person skilled in the art.

In order to obtain the support of the present invention, it is preferable to calcinate, preferably in the presence of molecular oxygen, for example by carrying out flushing with air, at a temperature of less than or equal to 1200° C.

At least one calcination can be carried out after any one of the preparation stages.

This drying or calcination treatment can be carried out in a crossed bed, in a swept bed or in a static atmosphere. For example the oven used can be a rotary oven, or a vertical oven with radial crossed layers.

The calcination conditions (temperature and duration) depend not only on the maximum temperature of use of the support, but also on the desired specific surface area. Thus, it is desirable to have a specific surface area measured by nitrogen adsorption of less than 80 $m^2/g$, preferably less than 50 $m^2/g$.

Moreover, the preformed solid thus calcined shows, by X-ray diffraction, only the lines characteristic of the theta, kappa or alpha crystalline forms.

The preferred calcination conditions are between more than one hour at 500° C., and less than one hour at 1200° C. The calcination can be carried out in the presence of water vapor. The calcination can optionally be carried out in the presence of an acid or basic vapor. For example, the calcination can be carried out under partial pressure of ammonium hydroxide.

d) Deposition of the Surface Layer of the Support

This involves generating an additional porosity on the porosity of the preformed solid. This additional porosity is called "secondary" in contrast to the main porosity of the preformed solid.

Any technique can be used which generates the presence of an aluminum salt in the main porosity of the support, then converts this salt to hydroxide.

By salt is meant any ionic form of aluminum which is soluble in a protic solvent, preferably water. The oxide or hydroxide colloids of aluminum are thus totally excluded from the scope of the invention.

According to a first preparation method, this aluminum salt can be supplied by impregnation of the support using an external aluminum salt.

By external is meant that the aluminum source is not supplied by the support itself. The aluminum source can be in either acid form or basic form.

Among the acid sources, there can be mentioned those having a mineral counter ion, for example aluminum chloride, aluminum sulfate, aluminum nitrate or those having organic counter ions, such as for example a carboxylic group.

Among the basic forms, there can be mentioned basic aluminum salts such as, for example, sodium aluminate and potassium aluminate.

These aluminum salts are dissolved in a protic solvent (preferably water) at the desired aluminum concentration. Of course this concentration is governed by the desired quantity of aluminum which should be deposited on the alumina support, but also by the solubility of the aluminum salt in the solvent.

One or more aluminum-salt-complexing agents can be added to this solution. These complexing agents are known to a person skilled in the art.

For example, there can be mentioned J. Kragten, in "Atlas of Metal-ligand equilibria in Aqueous Solution", Ellis Horwood Limited Pub., 1978 in order to obtain the complexing constant values with aluminum (acetylacetone, citrate, fluorine, sulfate, formate, oxalate etc.).

A basic agent can also be added, for example ammonia, soda, potash etc. or considered as a basic source by heat decomposition, for example urea which causes the precipitation of the aluminum salt.

According to another preferred preparation method, the aluminum source can be supplied by partial dissolution of the preformed solid. This dissolution can be caused by the supply of an acid, basic and/or complexing source known to a person skilled in the art, in order to increase the solubility of the aluminum. For more detail on these different sources, there can be mentioned Baes and Mesmer in "The Hydrolysis of Cations", Krieger Publishing Company, 1986; and J. Kragten in "Atlas of Metal-ligand equilibria in Aqueous Solution", (op. cit.) Ellis Horwood Limited Pub., 1978.

The previous two preparation modes can also be used simultaneously or successively (and in this case first the dissolution of the preformed solid, then the introduction of an aluminum salt) in order to increase the quantity of aluminum dissolved and/or to increase or reduce the porosity.

The impregnation of these salts or sources is carried out according to techniques known to a person skilled in the art. Preferentially, the incipient humidity impregnation or dry impregnation technique is used.

e) Final Calcination of the Support

A final calcination of the support formed at the end of stages a), b), c), d) can optionally be carried out by any technique known to a person skilled in the art.

In order to obtain the support of the present invention, it is preferable to calcinate the support and preferably in the presence of molecular oxygen, for example by carrying out flushing with air, at a temperature of less than or equal to 1100° C.

At least one calcination can be carried out after any one of the stages of the preparation described previously, i.e. a), b), c).

This treatment can be carried out in a crossed bed, in a swept bed or in a static atmosphere. For example the oven can be a rotary oven, or a vertical oven with radial crossed layers.

The calcination conditions (temperature and duration) depend mainly on the maximum temperature of use of the catalyst. The final calcination conditions are preferentially between more than one hour at 200° C., and less than one hour at 1000° C.

The final calcination of the support can be carried out in the presence of water vapor. The final calcination can optionally be carried out in the presence of an acid or basic vapor. For example, the final calcination can be carried out under partial pressure of ammonium hydroxide.

The support prepared according to the process described above, i.e. by following stages a); b); c); d); e) has the following characteristics:

a specific surface area measured by nitrogen adsorption isotherm, of less than 90 $m^2/g$, preferably less than 80 $m^2/g$, very preferably less than 75 $m^2/g$;

a pore volume obtained by mercury intrusion of at least 0.3 $cm^3/gram$;

an at least bimodal distribution of porosity making it possible to distinguish a main porosity characterized in that at least 80%, preferably at least 85%, very preferably 90% of the total pore volume corresponds to pores larger than 15 nm, and in that at least 3%, preferably at least 4%, very preferably 5% of the total pore volume corresponds to pores smaller than 12 nm;

an ordered relationship between the main porosity and the secondary porosity defined by the fact that any element in the main porosity is connected either to the outside of the particle, or to at least one element in the secondary porosity, this expression to be taken in a non-exclusive sense. This ordered structure can be observed by scanning electron microscopy (SEM) by studying the structure on fracture;

crystallographic phases determined by X-ray diffraction corresponding to the alpha or theta or kappa or delta or gamma aluminas.

EXAMPLE

A macroporous alumina is used with a specific surface area equal to 28 $m^2/g$ determined by the BET method.

The crystallographic phases of this macroporous alumina, determined by X-ray diffraction correspond to theta alumina and alpha alumina (30% and 70% respectively).

30 g of this macroporous alumina is impregnated with a solution comprising 68.3 g of nonahydrated aluminum nitrate at 97% by mass and 33.5 ml of distilled water.

Said solution is added dropwise. The solid thus obtained is left in maturation for 1 hour at ambient temperature, then placed in an oven at 120° C. for 12 hours.

The solid is then calcined under air at 530° C. for 2 hours.

The solid obtained has a specific surface area of 50 m$^2$/g, i.e. a surface-area gain of 85% relative to the starting alumina.

This solid has a total pore volume of 0.52 cm$^3$/g determined by mercury intrusion with the following pore distribution:

62% of the pore volume is generated by pores larger than 100 nm;

32% of the total pore volume is generated by pores comprised between 100 nm and 15 nm;

6% of the total pore volume is generated by pores smaller than 12 nm.

The main porosity larger than 15 nm therefore represents 94% of the total porosity. Study of the sample by scanning electron microscopy on a fracture shows the presence of gamma alumina particles with a pore size of less than 10 nm at the surface of the macroporous alumina.

The invention claimed is:

1. A calcined alumina-based catalyst support having the following characteristics:
   a specific surface area measured by nitrogen adsorption isotherm, of not more than 50 m$^2$/g
   a total pore volume measured by mercury intrusion of at least 0.3 cm$^3$/gram;
   an at least bimodal distribution of porosity characterized by a main porosity wherein at least 80% of the total pore volume corresponds to pores larger than 15 nm and a secondary porosity characterized by the fact that at least 3% of the total pore volume corresponds to pores smaller than 12 nm;
   an ordered relationship between the main porosity and the secondary porosity defined by the fact that any element in the main porosity is connected either to the outside of the support particle, or to at least one element in the secondary porosity, or to the outside of the support particle and at least one element in the secondary particle.

2. A support according to claim 1, in which at least 85% of the total pore volume corresponds to pores larger than 15 nm and at least 4% of the total pore volume corresponds to pores smaller than 12 nm.

3. A support according to claim 1, wherein at least 90% of the total pore volume corresponds to pores larger than 15 nm and at least 5% of the total pore volume compounds to pores smaller than 12 nm.

4. A preparation process for the support according to claim 1 comprising providing a preformed alumina solid on which a surface layer is deposited, followed by calcination and in which said deposition comprises simultaneously or successively dissolving the preformed solid partially and introducing an external aluminum salt, the partial dissolving of the preformed solid being carried out before the introduction of an aluminum salt in the case where the preparation methods are carried out successively, said introduction of an aluminum salt being carried out by incipient humidity impregnation or dry impregnation, so as to form said calcined alumina-based catalyst support.

5. A preparation process according to claim 4 in which the deposition of the surface layer is obtained from an external aluminum salt, the aluminum salt being dissolved in a protic solvent and having an acid or basic source.

6. A preparation process according to claim 5 in which the acid source of the aluminum salt has a mineral counter ion said mineral counter ion being selected from the group consisting of chloride, sulfate and nitrate.

7. A preparation process according to claim 5 in which the acid source of the aluminum salt has an organic counter ion.

8. A preparation process according to claim 5 in which aluminum salt has a basic source of aluminum sodium aluminate and/or potassium aluminate.

9. A preparation process according to claim 4 in which the aluminum source is supplied by partial dissolution of the preformed solid, said dissolution being caused by the supply of an acid, basic and/or complexing source.

10. A preparation process according to claim 9 in which the dissolution is caused by a complexing source and the complexing source is an aluminum salt selected from the group consisting of the citrate, oxalate and formate.

11. A preparation process according to claim 4 further comprising subjecting the resultant alumina-based catalyst support to final calcination conditions between more than one hour at 200° C., and less than one hour at 1000° C.

12. A preparation process according to claim 7, wherein the organic counter ion is a carboxylic group.

* * * * *

UNITED STATES PATENT AND TRADEMARK OFFICE
CERTIFICATE OF CORRECTION

PATENT NO. : 7,641,887 B2
APPLICATION NO. : 11/236799
DATED : January 5, 2010
INVENTOR(S) : Revel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this

Sixteenth Day of November, 2010

David J. Kappos
*Director of the United States Patent and Trademark Office*